US006992458B2

(12) United States Patent
Hashimoto et al.

(10) Patent No.: US 6,992,458 B2
(45) Date of Patent: Jan. 31, 2006

(54) EMERGENCY STOP CIRCUIT

(75) Inventors: Yoshiki Hashimoto, Hadano (JP); Nobuo Chino, Yamanashi (JP); Yoshikiyo Tanabe, Fujiyoshida (JP); Makine Yuyama, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/999,948

(22) Filed: Dec. 1, 2004

(65) Prior Publication Data

US 2005/0122078 A1 Jun. 9, 2005

(30) Foreign Application Priority Data

Dec. 3, 2003 (JP) ............................ 2003-404801

(51) Int. Cl.
*G05B 9/02* (2006.01)

(52) U.S. Cl. ................ 318/568.13; 318/638; 318/563; 700/21; 700/245; 361/31

(58) Field of Classification Search ................ 318/560, 318/568.11, 568.12, 568.13, 563, 638; 700/245, 700/21, 264, 123; 701/23; 361/30–32; 307/125
See application file for complete search history.

(56) References Cited

U.S. PATENT DOCUMENTS

| | | | | |
|---|---|---|---|---|
| 4,817,750 | A * | 4/1989 | Ishida et al. | 180/168 |
| 5,587,640 | A * | 12/1996 | Ek et al. | 318/638 |
| 5,903,123 | A * | 5/1999 | Shimogama | 318/568.13 |
| 6,051,894 | A * | 4/2000 | Shimogama | 307/125 |
| 6,108,179 | A * | 8/2000 | Katae et al. | 361/31 |
| 6,484,076 | B2 * | 11/2002 | Hwang et al. | 701/23 |
| 6,570,355 | B2 * | 5/2003 | Morita et al. | 318/563 |
| 2001/0027352 | A1 * | 10/2001 | Morita et al. | 700/123 |
| 2004/0078116 | A1 * | 4/2004 | Hashimoto et al. | 700/264 |
| 2004/0215354 | A1 * | 10/2004 | Nakamura et al. | 700/21 |
| 2005/0010332 | A1 * | 1/2005 | Abe et al. | 700/245 |

FOREIGN PATENT DOCUMENTS

| | | |
|---|---|---|
| JP | 10-217180 | 8/1998 |

* cited by examiner

*Primary Examiner*—Paul Ip
(74) *Attorney, Agent, or Firm*—Staas & Halsey LLP

(57) ABSTRACT

Two emergency stop lines are provided. Due to contacts being opened by commands from emergency stop factors and from first and second CPUs, conducting to first and second contactors are stopped. Contacts of the contactors are opened, and power supply to the motor is interrupted, whereby an emergency stop is performed. Further, the first CPU on the first line transmits an abnormality signal to the second CPU when the states of the contacts on the self emergency stop line, detected by digital inputs, are abnormal, and the second CPU opens a contact on the self emergency stop line so as to cause the contactor to be non-excited to thereby stop power supply to the motor.

11 Claims, 7 Drawing Sheets

EMERGENCY STOP CIRCUIT

BACKGROUND OF THE INVENTION

1. Field of the Invention

The present invention relates to emergency stop circuits, in various machines such as robots or machine tools, for stopping operations thereof in an emergency.

2. Description of the Related Art

In a robot system, a safety measure is taken by surrounding the robot operating range with a fence so as not to let a person come into the robot operating area within the fence. The fence is provided with a door or the like, and when the door is opened, an emergency stop signal is output so as to stop the operation of the robot. Further, when an operation is taught to the robot, a teaching pendant is controlled to operate the robot, so the teaching pendant is provided with an emergency stop command button or the like, whereby the operation of the robot is stopped in an emergency by inputting an emergency stop signal through the button (see, for example, Japanese Patent Application Laid-open No. 10-217180).

Further, machine tools, injection molders or the like are also so configured that when a door of a processing unit or the like is opened, an emergency stop signal is output so as to stop the operation of the machine. That is, driving of the motor for driving an operable unit of the machine is stopped in an emergency to thereby stop the operation of the machine.

FIG. 7 shows an example of an emergency stop circuit used for a robot system or the like. In order not to damage the safety when one element of the emergency stop circuit is failed, the emergency stop circuit of the robot system is configured to detect emergency stop factors through independent two systems of emergency stop lines, composed of components with contacts such as relays, respectively. The machine is so configured that through a safety relay circuit 13 connected with the emergency stop circuit, power supply contacts Ca and Cb are controlled so as to interrupt power supply to the servo motor 12 for driving the machine to thereby cause the machine to be in the emergency stop state.

There are various matters serving as factors for stopping machines in an emergency, depending on machines. They include an emergency stop button and a door switch. FIG. 7 shows two emergency stop factors 14 and 15. The emergency stop factor 14 interrupts power supply to the relays R1_a_ and R1_b_ for the two systems of emergency stop lines A and B when the emergency stop button is manipulated. On the other hand, the emergency stop factor 15 opens a contact thereof by a relay, not shown, so as to stop power supply to the relays R2_a_ and R2_b_. These relays or the like are provided as many as emergency stop factors. In FIG. 7, two emergency stop factors 14 and 15 are shown as examples.

In each of the two systems of the emergency stop lines A and B, normally-open contacts of the relays for respective emergency stop factors are connected in series. In the example shown in FIG. 7, on the line A, a normally-open contact r1_a_ of the relay R1_a_, a normally-open contact r2_a_ of the relay R2_a_, a normally-open contact r3_a_ of a relay R3_a_ operable by a command from the CPU 10, a normally-open contact k1_a_ of a safety relay K1 in the safety relay circuit 13, and a safety relay K2 are connected in series, and a voltage is applied to either end of the series circuit. A normally-open contact k2_a_ of the safety relay K2 is connected in parallel with the normally-open contact k1_a_ of the safety relay K1.

Similarly, on the line B of the other system, a normally-open contact r1_b_ of the relay R1_b_, a normally-open contact r2_b_ of the relay R2_b_, a normally-open contact r3_b_ of a relay R3_b_ operable by a command from the CPU 10, a normally-open contact k1_b_ of a safety relay K1 on the safety relay circuit 13, and a safety relay K3 are connected in series, and a voltage is applied to either end of the series circuit. A normally-open contact k3_a_ of the safety relay K3 is connected in parallel with the normally-open contact k1_b_ of the safety relay K1.

Relating to the contactor Ca, a normally-close contact k1_c_ of the safety relay K1, a normally-open contact k2_c_ of the safety relay K2, and a normally-open contact k3_c_ of the safety relay K3 are connected in series, and a voltage is applied to the series circuit. Similarly, relating to the contactor Cb, a normally-close contact k1_d_ of the safety relay K1, a normally-open contact k2_d_ of the safety relay K2, and a normally-open contact k3_d_ of the safety relay K3 are connected in series, and a voltage is applied to the series circuit.

The servo amplifier 11 is connected with a three-phase power source via contacts Ca1 and Cb1; Ca2 and Cb2; and Ca3 and Cb3, which are connected in series for respective phases. The contacts ca1, ca2 and ca3 are normally-open contacts, for respective phases, of the contactor Ca, and the contacts cb1, cb2 and cb3 are normally-open contacts, for respective phases, of the contactor Cb. Further, the normally-close contacts ca4 and cb4 of the contactors Ca and Cb, the normally-close contacts k2_b_ and k3_b_ of the safety relays K2 and K3, and the safety relay K1 are connected in series, and a voltage is applied to either end of the series circuit.

In FIG. 7, "DI" indicates a digital input element, and "DO" indicates a digital output element. The digital input elements DI constitutes a detecting means for detecting the states of respective contacts of the relays R1_a_ to R3_a_ and R1_b_ to R3_b_ operable by the emergency stop factors 14 and 15 and commands from the CPU 10.

At the time of power being supplied, the safety relay K1 operates to close the normally-open contacts k1_a_ and k1_b_ thereof, and to open the normally-close contacts k1_c_ and k1_d_. If no emergency stop command is inputted from an emergency stop factor, the contacts r1_a_ to r3_a_ on the line A and the contacts r1_b_ to r3_b_ on the line B are closed so that the safety relays K2 and K3 are excited, and the safety relays K2 and K3 are self held via the contacts k2_a_ and k3_a_. Due to the safety relays K2 and K3 being excited, the normally-close contacts k2_b_ and k3_b_ are opened, so that the safety relay K1 is non-excited. Thereby, the contact k1_c_ to k3_c_ are closed, and the contactor Ca is excited. Similarly, the contact k1_d_ to k3_d_ are closed, and the contactor Cb is excited. Consequently, the contacts of the contactors Ca and Cb are closed, so that the power is supplied to the servo amplifier 11 from the power source, whereby the servo motor 12 becomes operable.

If an emergency stop command is inputted due to any one of the emergency stop factors 14 and 15, or an emergency stop command is outputted from the CPU 10, and the contacts r1_a_ to r3_a_ or the contacts r1_b_ to rb3 on either emergency stop line A or B are opened, the safety relay K2 and/or the safety relay K3 is non-excited, whereby the contactors k2_c_, k2_d_, k3_c_ and k3_d_ are opened and the contactors Ca and Cb are non-excited, whereby the contacts ca1 to ca3 and cb1 to cb3 are opened to thereby interrupt power supply to the servo motor 12. Consequently, operation of the servomotor 12 is stopped, and the machine is stopped in an emergency.

The conventional emergency stop circuit uses a safety relay circuit composed of safety relays in which operations of the contacts are assured, whereby specially-designed, expensive components must be used. Further, the circuit is complicated and a number of general components must be used as well. This causes an adverse effect on the cost and reliability.

SUMMARY OF THE INVENTION

An emergency stop circuit according to the present invention comprises: two emergency stop lines, each of which is connected with a contactor; and a power supply circuit for supplying power to a motor for driving a machine from a power source via series circuits composed of contacts of respective contactors. In each emergency stop line, a contact which is opened when an emergency stop command signal is inputted from an emergency stop factor, and a contact which is opened by a command from a CPU provided to each emergency stop line, are connected in series to thereby connect the contactor with the power source. The states of these contacts are detected by a detecting means.

In one mode of the emergency stop circuit of the present invention, each CPU outputs a command to open a contact on the self emergency stop line when information about the states of the contacts on the self emergency stop line, detected by the detecting means, and information about the states of the contacts on the other emergency stop line, transmitted from the other CPU, do not coincide with each other.

In a second mode of the emergency stop circuit of the present invention, each CPU determines whether the states of the contacts on the self emergency stop line, detected by the detecting means, are normal to conduct the contactor, and if they are not normal, the CPU transmits an abnormality signal to the other CPU, and the CPU which receives the abnormality signal outputs a command to open a contact on the self emergency stop line.

A CPU, determining that the states of the contacts of the self emergency stop line are not normal to conduct the contactor, may also outputs a command to a contact on the self emergency stop line to open the contact.

The first and second modes of the emergency stop circuit according to the present invention can take the following aspects.

The CPUs transmit and receive a watchdog signal between them so as to check, with each other, whether an operation of the other CPU is normal, and when either CPU detects an abnormal operation of the other CPU through the check, the CPU outputs a command to open a contact on the self emergency stop line to thereby open the self emergency stop line.

Each contactor is provided with a detecting contact operable with the contacts of the contactor so as to detect contact states thereof, and a contact state detecting means for detecting a contact state of the detecting contact, and detected information from the contact state detecting means is included in the states of the contacts of the emergency stop line.

An additional CPU is provided besides the respective CPUs corresponding to the respective emergency stop lines, and contacts, which are opened by a command from the additional CPU, are provided on respective emergency stop lines. The respective CPUs corresponding to the respective emergency stop lines and the additional CPU transmit and receive watchdog signals between them so as to check whether operations of the CPUs are normal. When the additional CPU detects an abnormal operation in either of the CPUs corresponding to the respective emergency stop lines, the additional CPU outputs at least a command to open a contact provided on the emergency stop line of the CPU in which the abnormal operation is detected.

An additional CPU is provided besides the respective CPUs corresponding to the respective emergency stop lines. The respective CPUs corresponding to the respective emergency stop lines and the additional CPU transmit and receive watchdog signals between them so as to check whether operations of the CPUs are normal. When the additional CPU detects an abnormal operation in either of the CPUs corresponding to the respective emergency stop lines, the additional CPU outputs at least an emergency stop command to a CPU in which the abnormal operation is not detected, and the CPU receiving the emergency stop command outputs a command to open a contact provided on the emergency stop line.

The emergency stop circuit of the present invention does not require a safety relay circuit composed of expensive safety relays with contact operation assurance. Further, an emergency stop is performed by outputting emergency stop commands doubly by the hardware and the software, whereby the emergency stop can be performed more securely. Moreover, a CPU, on the emergency stop line in which an abnormality is detected, transmits an abnormality signal to the other CPU on the other emergency stop line so as to open the emergency stop line on the other CPU side, whereby the emergency stop can be performed more securely.

BRIEF DESCRIPTION OF THE DRAWINGS

The above and other objects and features of the present invention will become apparent from the following description of embodiments with reference to the accompanying drawings, in which.

DESCRIPTION OF THE EMBODIMENTS

Figure 1:
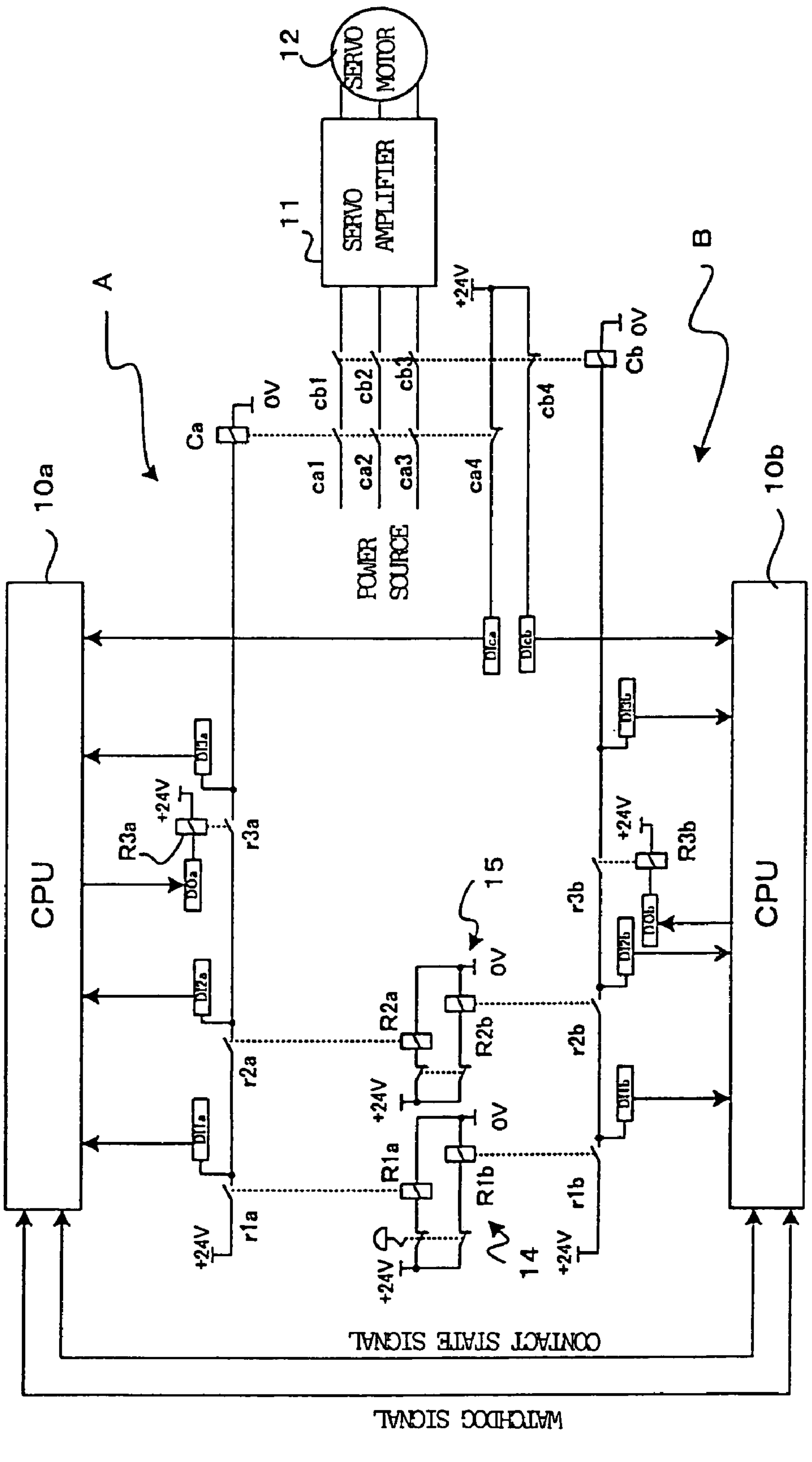
FIG. 1 is a circuit diagram showing a first embodiment of an emergency stop circuit according to the present invention.

FIG. 1 is a circuit diagram of a first embodiment of an emergency stop circuit according to the present invention, the circuit being applied to a driving motor in a robot, a machine tool or various industrial machinery.

Figure 7:
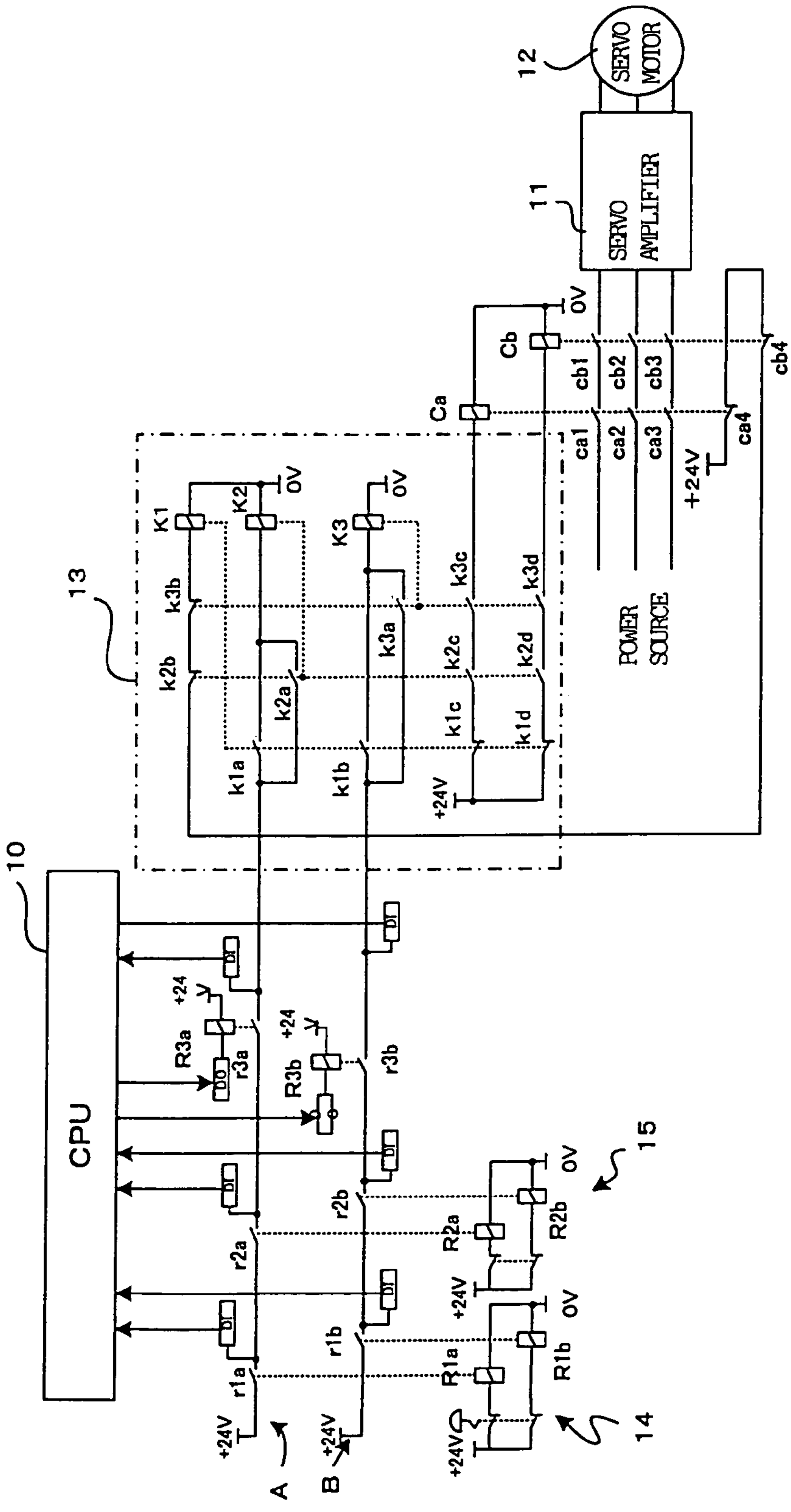
FIG. 7 is a circuit diagram for a conventional emergency stop.

Comparing with the conventional emergency stop circuit shown in FIG. 7, the present embodiment is characterized in that the safety relay circuit 13 is Omitted while another CPU is added so as to have two CPUs (a first CPU 10*a* and a second CPU 10*b*).

In the emergency stop circuit of FIG. 1, emergency stop factors are detected by independent two systems of circuits, as same as the emergency stop circuit of FIG. 7. The circuit has relays, and contacts to stop power supply to the relays, for the two systems of the emergency stop lines A and B, respectively. The emergency stop factors and the number thereof are different depending on machines to apply. In the example shown in FIG. 1, two emergency stop factors 14 and 15 are indicated. In this example, power supply to relays R1*a*, R1*b*, R2*a* and R2*b* is interrupted by a push button for one emergency stop factor 14, or by relay contacts for the other emergency stop factor 15, whereby an emergency stop command is transmitted.

On the line A, a contact r1*a* of the relay R1*a* for the emergency stop factor 14, a contact r2*a* of the relay R2*a* for the emergency stop factor 15, a contact r3*a* of a relay R3*a* operable by a command from the first CPU 10*a*, and a contactor Ca are connected in series, and a voltage is applied to either end of the series circuit. Similarly, on the line B, a contact r1*b* of the relay R1*b* for the emergency stop factor 14, a contact r2*b* of the relay R2*b* for the emergency stop factor 15, a contact r3*b* of a relay R3*b* operable by a command from the second CPU 10*b*, and a contactor Cb are connected in series, and a voltage is applied to either end of the series circuit.

Further, the line A includes digital input elements DI1*a* to DI3*a* constituting a detection means with which the first CPU 10*a* detects the states of the contacts r1*a* to r3*a*. Similarly, the line B includes digital input elements DI1*b* to DI3*b* constituting a detection means with which the second CPU 10*b* detects the states of the contacts rib to r3*b*.

On the line A, when each contact r1*a* to r3*a* is closed, a high level is detected from each digital input element DI1*a* to DI3*a*. When the contact r1*a* is closed but the contact r2*a* is opened, a high level ("1") is detected from the digital input element DI1*a* for the contact r1*a*, and a low level ("0") is detected from the digital input element DI2*a* for the contact r2*a*. Similarly, on the line B, when each contact r1*b* to r3*b* is closed, a high level ("1") is detected from each digital input element DI1*b* to DI3*b*.

Reference numerals DOa and DOb indicate digital output elements. The first CPU 10*a* and the second CPU 10*b* drive the relays R3*a* and R3*b* via the digital output elements Doa and Dob, respectively.

A servo amplifier 11 for driving a servo motor 12 connects with a three-phase power source via contacts ca1, cb1; ca2, cb2; and ca3, cb3, connected in series for each phase. The contacts ca1, ca2 and ca3 are normally-open contacts for respective phases of the contactor Ca, and the contacts cb1, cb2 and cb3 are normally-open contacts for respective phases of the contactor Cb. One end of a normally-close contact ca4 of the contactor Ca connects with a direct-current power source, and the other end thereof connects with a digital input element DIca, whereby the first CPU 10*a* monitors the states of the contacts of the contactor Ca. Similarly, one end of a normally-close contact cb4 of the contactor Cb connects with the direct-current power source, and the other end thereof connects with a digital input element DIcb, whereby the second CPU 10*b* monitors the states of the contacts of the contactor Cb.

When the power is supplied, the relays R1*a*, R1*b*, R2*a* and R2*b* for the emergency stop factors 14 and 15 are excited, and the normally-open contacts r1*a*, r1*b*, r2*a* and r2*b* thereof are closed. Further, since no emergency stop command is output from the first CPU 10*a* or the second CPU 10*b*, the relays R3*a* and R3*b* are excited, and the contacts r3*a* and r3*b* thereof are closed. Consequently, the contactors Ca and Cb are excited so as to close the normally-open contacts ca1 to ca3 and cb1 to cb3 thereof, whereby the power is supplied to the servo amplifier 11 so that the servo motor 12 is in the operable state. In this normal operable state, the first CPU 10*a* receives signals of "1, 1, 1, 0" from the digital input elements DI1*a*, DI2*a*, DI3*a*, and DIca. Similarly, the second CPU 10*b* receives signals of "1, 1, 1, 0" from the digital input elements DI1*b*, DI2*b*, DI3*b*, and DIcb.

Now, if any emergency stop factor is operated, for example, if the emergency stop factor 15 is operated, the relays R2*a* and R2*b* thereof are operated and the respective contacts r2*a* and r2*b* thereof are opened, so that the power supply to the contactors Ca and Cb stops. Thereby, the contactors Ca and Cb stop their operations and open the normally-open contacts ca1 to ca3 and cb1 to cb3 so as to stop the power supply to the servo amplifier 11. Here, even if one relay of the emergency stop factor 15 or one of the contactors Ca and Cb is failed, it is possible to stop the power supply to the servo motor 12 and to perform an emergency stop securely, if the other relay or contactor works normally. For example, even in a case where the relay R2*a* is failed and the contact r2*a* thereof is not opened, the relay R2*b* operates to cause the contactor Cb to be non-excited, so that the normally-open contacts cb1, cb2 and cb3 are opened. Thereby, the power supply to the servomotor is stopped securely. Similarly, if the contactor Cb is operationally failed, for example, the contactor Ca operates to interrupt the power supply to the servomotor 12.

As described above, by the relays operated by the emergency stop factors, the power supply to the servomotor 12 is stopped so as to perform an emergency stop securely by the dual-system hardware. Further, in the present embodiment, two CPUs, that is, the first CPU 10*a* and the second CPU 10*b*, execute an emergency stop by software, which provides a more secured emergency stop.

As methods for performing an emergency stop by software, the present embodiment uses two methods. One is a method in which emergency stop processing is performed when the operational states of respective contacts on respective emergency stop lines A and B, inputted from the digital input elements, do not coincide with each other. The other one is a method in which a watchdog signal is exchanged so as to check whether each CPU works normally, and if either CPU does not work normally, emergency stop processing is also performed by the other CPU.

Figure 2:
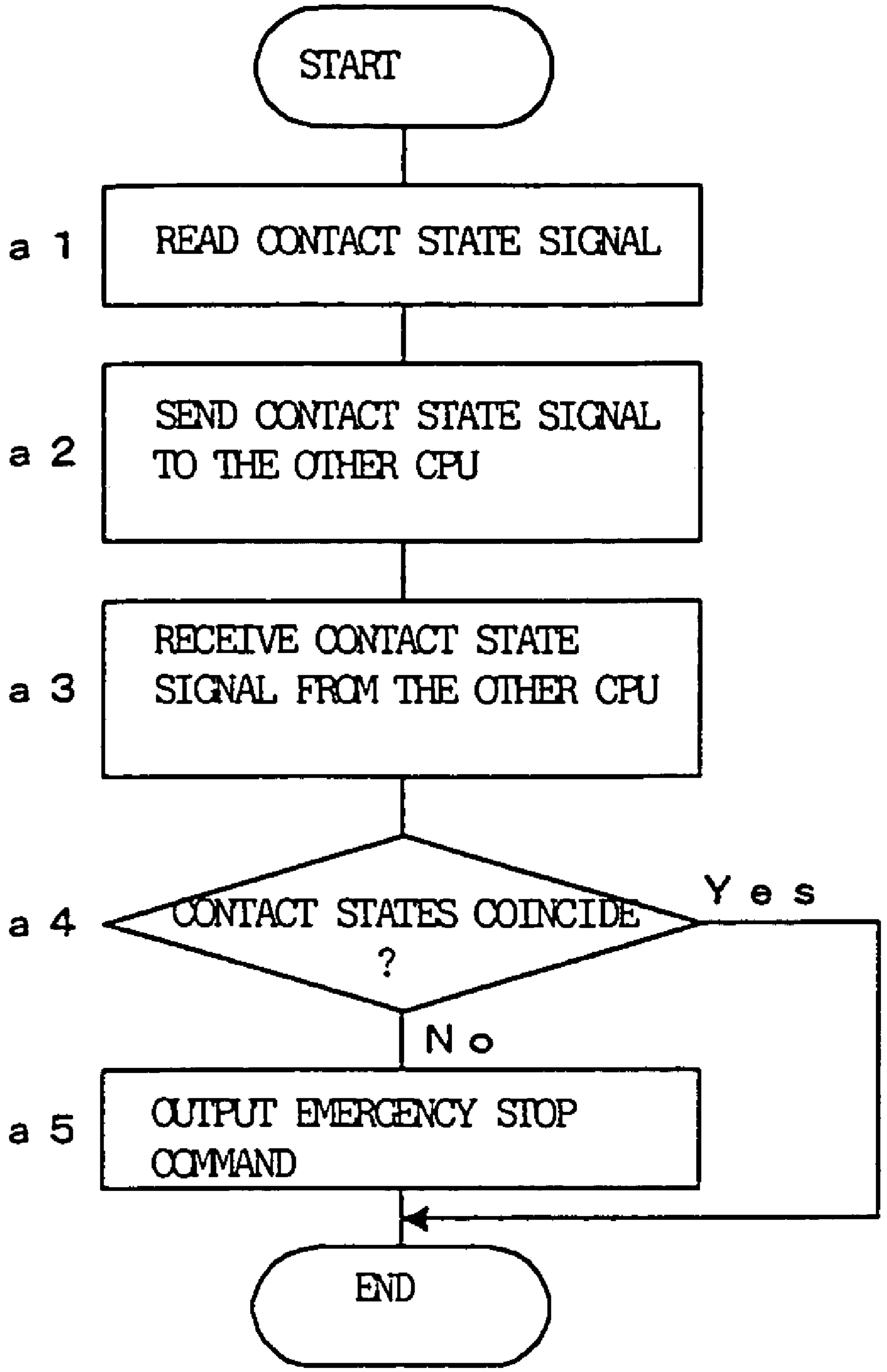
FIG. 2 is a flowchart showing emergency stop processing performed by a first CPU in the emergency stop circuit shown in FIG. 1.

FIG. 2 is a flowchart showing processing in which the first CPU 10*a* in FIG. 1 monitors the operational states of the contacts so as to detect unconformity in the operational states of the respective contacts on the emergency stop lines A and B to thereby perform emergency stop processing. The first CPU 10*a* performs this processing in prescribed cycles.

First, the first CPU 10*a* reads signals from the digital input elements DI1*a*, DI2*a*, DI3*a* and DIca, constituting the detecting means for detecting the contact states, of the line A (Step a1), and transmits information indicating the contact states to the second CPU-10*b* (Step a2). Further, the first CPU 10*a* receives information indicating the contact states of the line B, detected by the digital input elements DI1*b*, DI2*b*, DI3*b* and DIcb and transmitted from the second CPU 10*b* (Step a3), and determines whether the contact states of the line A and the contact states of the line B coincide with each other (Step a4). If they coincide, the first-CPU 10*a* ends the processing here.

On the other hand, if the contact states of the line A and the contact states of the line B do not coincide with each other, the first CPU 10*a* outputs an emergency stop signal. The first CPU 10*a* outputs an emergency stop signal of the line A of itself so as to cause the relay R3*a* to be non-excited via the digital output element DOa to thereby open the contact r3*a* thereof (Step a5). When the contact r3*a* is opened, the power supply to the contactor Ca is stopped, causing the contactor Ca to be non-excited. Thereby, the normally-open contact ca1 to ca3 are opened and the power supply to the servo amplifier 11 is interrupted, so that the operation of the servomotor 12 is stopped.

The second CPU 10*b* also performs processing similar to that shown in FIG. 2. In the similar processing of Steps a1 and a2, the second CPU 10*b* reads signals from the digital input elements DI1*b*, DI2*b*, DI3*b* and DIcb, and transmits them to the first CPU 10*a*. When the information indicating the operational states of the contacts transmitted from the first CPU 10*a* and the information indicating the operational states of the contacts read out by the second CPU 10*b* do not coincide with each other, the second CPU 10*b* causes the relay R3*b* to be non-excited so as to open the contact r3*b* thereof to thereby stop the operation of the servo motor 12. In this way, when the operational states of the contacts detected by the first CPU 10*a* and those detected by the second CPU 10*b* do not coincide, the contacts r3*a* and r3*b* are caused to be opened so as to cause the contactors Ca and Cb to be non-excited, whereby an operation to stop the operation of the servo motor 12 is performed.

Figure 3:
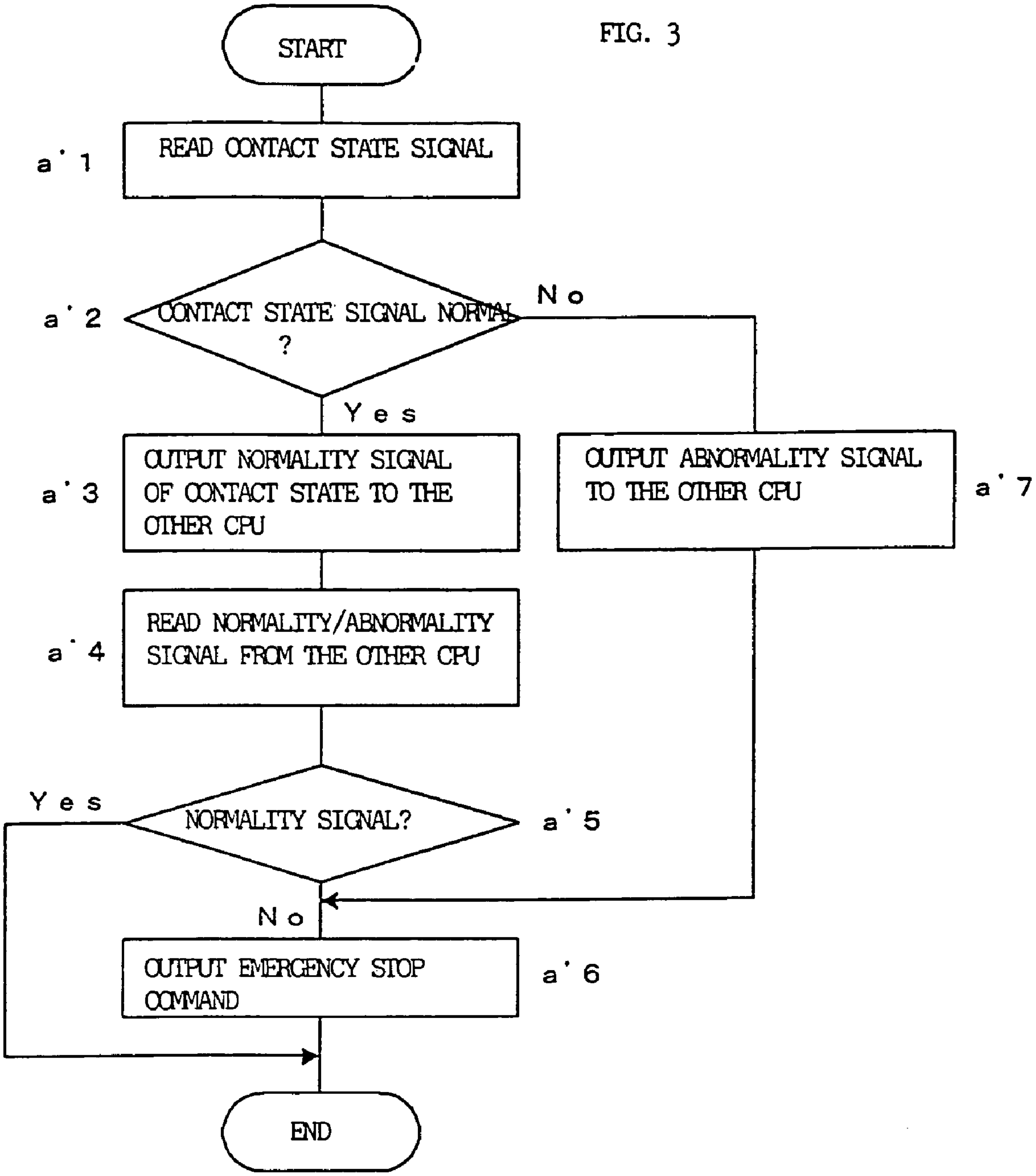
FIG. 3 shows a variation of the emergency stop processing shown in FIG. 2.

FIG. 3 is a flowchart showing a processing method, other than the one shown in FIG. 2, for performing an emergency stop on the basis of operational states of respective contacts of the emergency stop lines A and B, inputted from the digital input elements. In this method, the operational states of respective contacts inputted from the digital input elements are determined to be normal or not, and if not, an emergency stop signal is transmitted to the other CPU so as to cause emergency stop processing to be performed by the other CPU as well.

First, the first CPU 10*a* reads signals from the digital input elements DI1*a*, DI2*a*, DI3*a* and DIca constituting the detecting means for detecting the contact states (Step a'1), and determines whether or not the output pattern of the digital input elements DI1*a*, DI2*a*, DI3*a* and DIca shows "1, 1, 1, 0" which indicates the normal state (Step a'2). If the output pattern shows the normal state, the first CPU 10*a* transmits a normal state signal to the second CPU 10*b* (Step a'3). Further, the first CPU 10*a* reads signals transmitted from the second CPU 10*b* (Step a'4), and determines whether the signals read show the normal state (Step a'5), and if they show the normal state, ends the processing of this cycle. If, on the other hand, the first CPU 10*a* determines that the output pattern of the normal state cannot be read in Step a'2, the first CPU 10*a* transmits an abnormality signal to the second CPU 10*b* (Step a'7), and outputs an emergency stop signal so as to cause the relay R3*a* to be non-excited via the digital output element DOa to thereby open the contact r3*a* thereof (Step a'6). Further, if the first CPU 10*a* receives an abnormality signal transmitted from the second CPU 10*b* (Step a'5), the first CPU 10*a* also outputs an emergency stop signal so as to cause the relay R3*a* to be non-excited to thereby open the contact r3*a* thereof. With the contact r3*a* being opened, the power supply to the contactor Ca is stopped, so that the contact Ca is to be non-excited, and the normally-open contacts ca1 to ca3 thereof are opened to thereby interrupt the power supply to the servo amplifier 11 and stop the operation of the servo motor 12.

In other words, the first CPU 10*a* outputs an emergency stop signal when a signal pattern of the contact states detected from the line A of itself is abnormal and also when a signal pattern of the contact states in the other line B, transmitted from the second CPU 10*b*, is abnormal, so as to cause the contactor Ca to be non-excited to thereby stop the power supply to the servo amplifier 11.

The second CPU 10*b* also performs processing similar to that shown in FIG. 3. The second CPU 10*b* performs processing similar to that of the CPU 10*a* except that, in the processing of Steps a'1 and a'2, the second CPU 10*b* reads signals from the digital input elements DI1*b*, DI2*b* , DI3*b* and DIcb, and determines whether the output pattern of the digital input elements DI1*b*, DI2*b*, DI3*b* and the DIcb is "1, 1, 1, 0" which shows the normal state, and that, in Step a6, the second CPU 10*b* outputs an emergency stop command to the digital output DOb to thereby cause the relay R3*b* to be non-excited.

As described above, when a pattern of the contact state signals is abnormal, the contactor of the line of itself is caused to be non-excited and also caused the other contactor to be non-excited. With both of the two contactors being non-excited, an emergency stop can be performed further securely. Note that even in this case, an emergency stop command may be output only when an abnormality signal is transmitted from the other CPU (Steps a'4, a'5 and a'6).

If one emergency stop element is failed in each of the two emergency stop lines A and B in the emergency stop circuit, for example, when the contactor Ca is failed in the emergency stop line A whereby the contacts ca1 to ca3 cannot be opened, and further the relay R1*b* is failed in the emergency stop line B whereby the contact r1*b* cannot be opened, the servo motor cannot be stopped if the emergency stop means consists solely of hardware such as relays. That is, although the relay contact r1*a* is opened when an emergency stop signal due to the emergency stop factor 14 is inputted and the power supply to the relays R1*a* and R1*b* is released, the contacts ca1 to ca3 are not opened due to the failure of the contactor Ca, and further the relay contact r1*b* is not opened, whereby the contactor Cb is in the excited state, so that the contacts cb1 to cb3 are remained to be closed.

However, according to the present embodiment, when the relay r1*a* is opened, a pattern detected by the detecting means of the digital input elements DI1*a*, DI2*a*, DI3*a* and DIca of the first CPU 10*a* becomes "0, 0, 0, 0", which is different from the pattern "1, 1, 1, 0" showing the normal state. In the method shown in FIG. 3, the first CPU 10*a* detects the abnormality and transmits an abnormality signal to the second CPU 10*b*. Upon receipt of the abnormality signal, the second CPU 10*b* causes the relay R3*b* to be non-excited to thereby open the contact r3*b* thereof. Consequently, the contactor Cb working normally is caused to be non-excited so as to open the contacts cb1 to cb3 thereof to thereby stop the power supply to the servo motor 12 and perform an emergency stop.

Further, according to the method shown in FIG. 2, a pattern detected by the detecting means of the digital input elements DI1*b*, DI2*b* DI3*b* and DIcb on the side of the second CPU 10*b* is "1, 1, 1, 0" showing the normal state, so the contact states do not coincide with each other. Thereby, an emergency stop signal is outputted from each of the first CPU 10*a* and the second CPU 10*b* so as to cause the relays R3*a* and R3*b* to be non-excited to thereby open the contacts r3*a* and r3*b* and stop conducting to the contactors Ca and Cb. This enables to cause the contactor Cb working normally to be non-excited.

Figure 4:
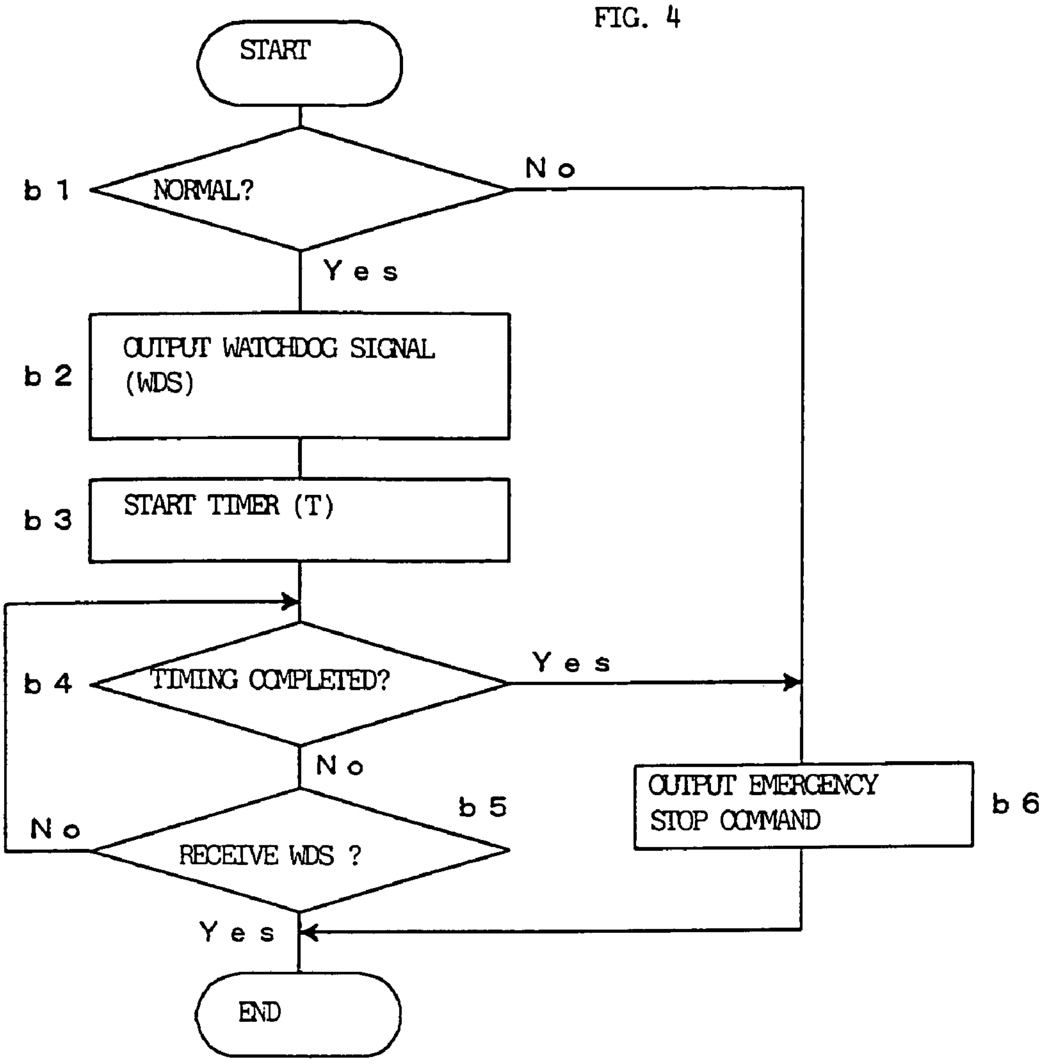
FIG. 4 is a flowchart showing emergency stop processing, using a watchdog signal, performed by the first CPU in the emergency stop circuit shown in FIG. 1.
Figure 5:
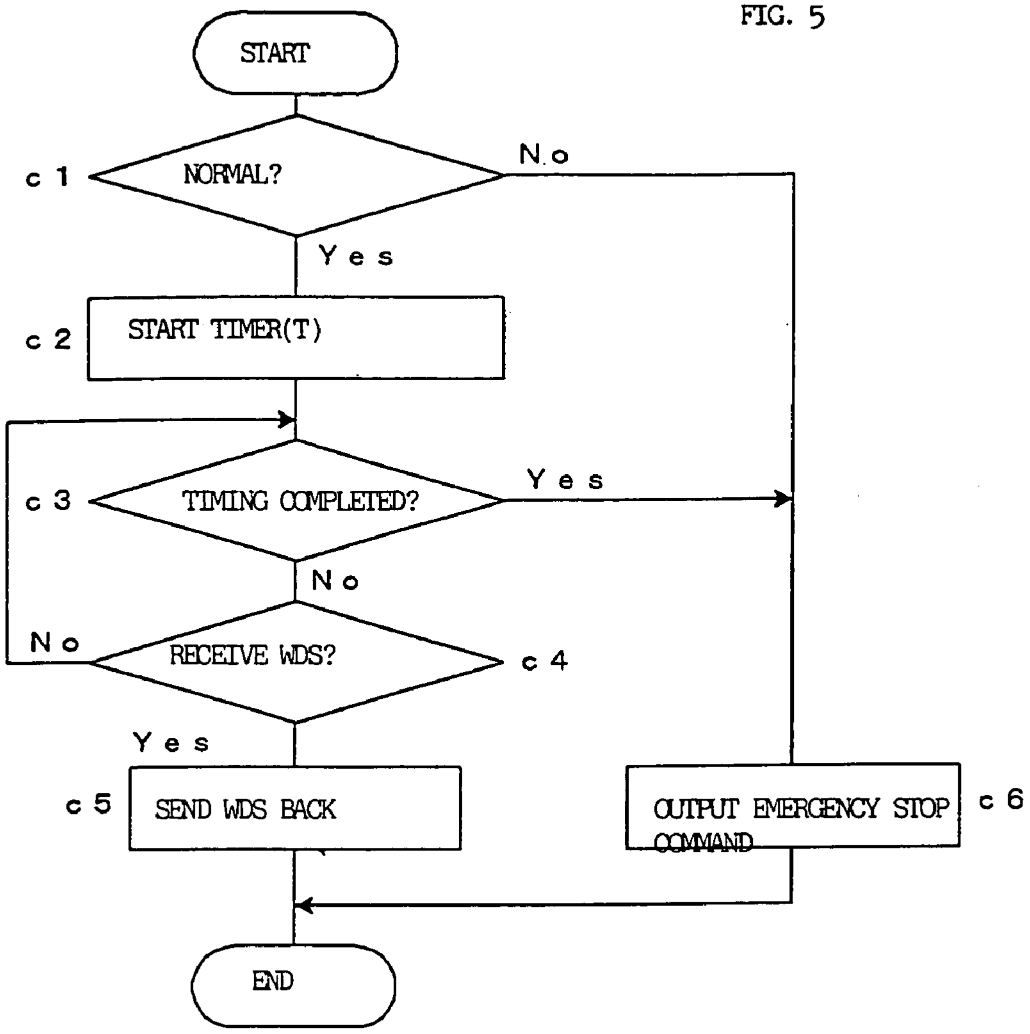
FIG. 5 is a flowchart showing emergency stop processing, using a watchdog signal, performed by a second CPU in the emergency stop circuit shown in FIG. 1.

Next, an explanation will be given for emergency stop processing performed based on a watchdog signal. FIGS. 4 and 5 show an example, among others, of emergency stop processing based on a watchdog signal. FIG. 4 shows processing performed by one CPU (the first CPU 10*a*) to cause an emergency stop by a watchdog signal, and FIG. 5 shows processing performed by the other CPU (the second CPU 10*b*). These two CPUs perform the processing in synchronization.

The first CPU 10*a* performs processing shown in FIG. 4 every prescribed cycles, and determines whether the first CPU 10*a* itself operates normally (Step b1). If it operates normally, the first CPU 10*a* outputs a watchdog signal WDS to the second CPU 10*b*, and resets a timer T and starts it (Steps b2, b3). If the watchdog signal WDS is sent back from the second CPU 10*b* before the timer T completes timing (Steps b4, b5), the first CPU 10*a* ends the processing as no abnormality is found.

On the other hand, if the first CPU 10*a* determines that the operation of itself is abnormal in Step b1, or if the timer T completes timing before the first CPU 10*a* receives the watchdog signal WDS, the first CPU 10*a* outputs an emergency stop command to the digital output DOa (Step b6) so as to cause the relay R3*a* to be non-excited to thereby open the contact r3*a* thereof, and to cause the contactor Ca to be non-excited to thereby open the contactors ca1 to ca3 thereof, and to interrupt the power supply to the servo motor 12 and perform an emergency stop.

The second CPU 10*b* performs the processing shown in FIG. 5 in synchronization with the performing cycles of the processing in FIG. 4 performed by the first CPU 10*a*. First, the second CPU 10*b* determines whether the second CPU 10*b* itself operates normally (Step c1), and if it operates normally, the second CPU 10*b* resets a timer T and starts it (Step c2, c3). If the second CPU 10*b* receives a watchdog signal WDS from the first CPU 10*a* before the timer T completes timing (Step c4), it sends the watchdog signal WDS back to the first CPU 10*a* (Step c5), and ends the processing of this processing cycle. On the other hand, if the second CPU 10*b* determines that the operation of itself is abnormal in Step c1, or the timer T completes the timing before the second CPU 10*b* receives the watchdog signal WDS, the second CPU 10*b* outputs an emergency stop command to the digital output DOb (Step c6) so as to cause the relay R3*b* to be non-excited to thereby open the contact r3*b* thereof, and to cause the contactor Cb to be non-excited to thereby open the contacts cb1-cb3 thereof, and to interrupt power supply to the servo motor and perform an emergency stop.

As described above, when one of the two CPUs does not operate normally, the contactor of the line on the side of the CPU is caused to be non-excited to thereby interrupt power supply to the servo amplifier 11, while a watchdog signal WDS is not sent to the other CPU. Thereby, the other CPU detects the fact that it does not receive the watchdog signal, and causes the contactor of itself to be non-excited to thereby interrupt power supply to the servo amplifier 11. In this way, an emergency stop is performed securely.

In the aforementioned embodiment, if one CPU does not operate normally, the relay R3*a* or R3*b* of the line on the side of the CPU is caused to be non-excited and the contactor is also caused to be non-excited to thereby interrupt power supply to the servo amplifier 11. However, since this CPU does not operate normally, it may be acceptable to perform only operation to cause the relay R3*a* or R3*b* of the line on the side of the other CPU to be non-excited and to cause the contactor to be non-excited.

The aforementioned first embodiment is provided with two systems for performing an emergency stop, whereby even when the hardware such as a relay in one system is abnormal, an emergency stop can be performed by the hardware such as a relay in the other system. Further, since the first embodiment uses commands from the CPUs, if an abnormality is detected in one system, an emergency stop command is outputted from the CPU of the system, while an emergency stop command is also outputted from the CPU of the other system, whereby an emergency stop can be performed further securely.

Figure 6:
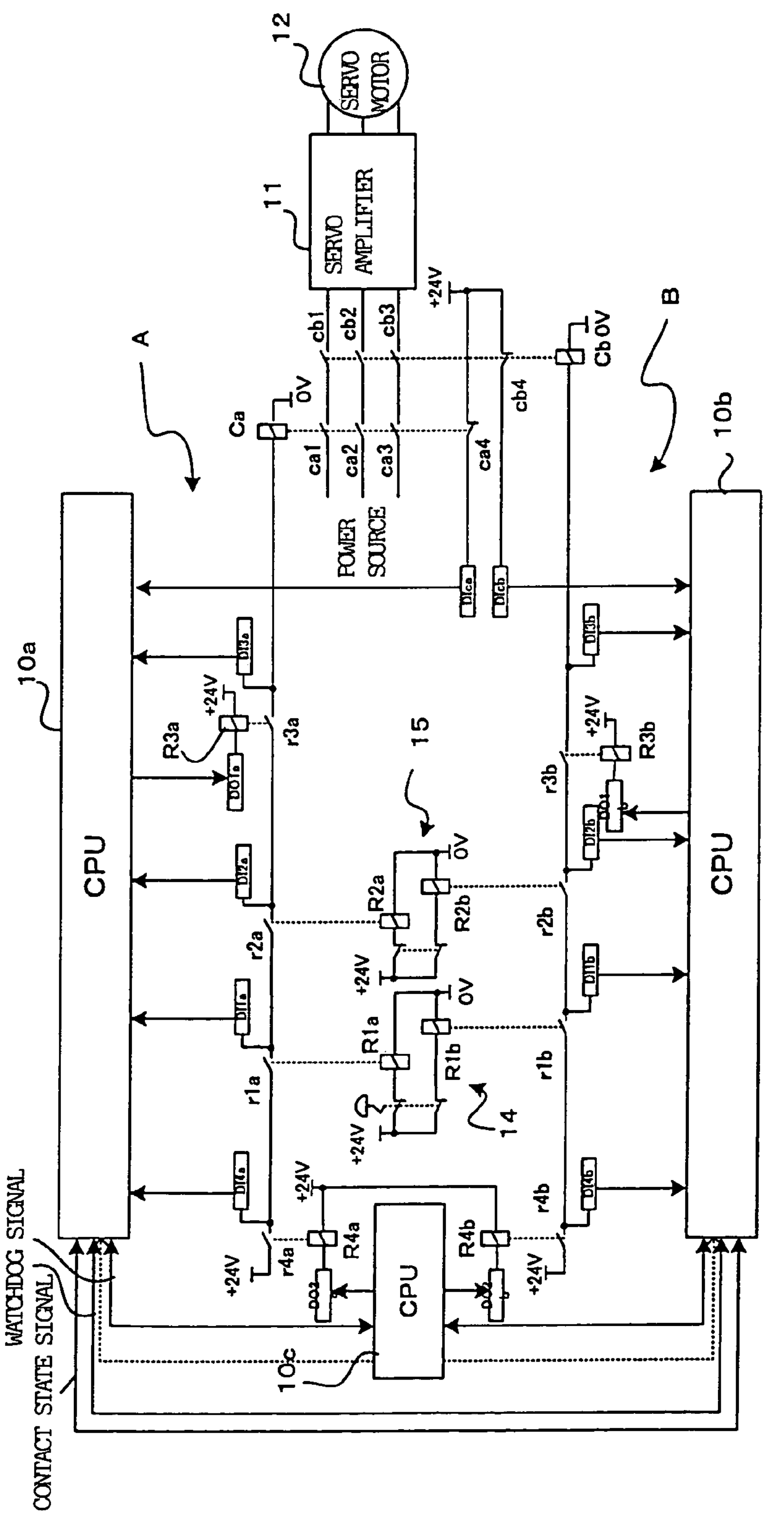
FIG. 6 is a circuit diagram showing a second embodiment of an emergency stop circuit according to the present invention.

FIG. 6 is an emergency stop circuit diagram according to a second embodiment of the present invention. The second embodiment is characterized in that a third CPU 10*c* is added to the first embodiment shown in FIG. 1. In this embodiment, normally-open contacts r4*a* and r4*b* of relays R4*a* and R4*b* driven by the third CPU 10*c* via digital output elements DO2*a* and DO2*b* are added to the lines A and B of the respective systems, and are connected in series with respective contacts of the relays for the emergency stop factors.

In the second embodiment, the only difference from the first embodiment is that watchdog signals are transmitted and received between the first CPU 10*a* and the third CPU 10*c*, and between the second CPU 10*b* and the third CPU 10*c* to thereby detect abnormal operations in the first CPU 10*a* and the second CPU 10*b*. When an abnormal operation is detected in either the first CPU 10*a* or the second CPU 10*b*; the relay R4*a* or R4*b* is caused to be non-excited so as to open the normally-open contact r4*a* or r4*b* to thereby perform an emergency stop.

That is, the third CPU 10*c* sends watchdog signals WDS to the first CPU 10*a* and to the second CPU 10*b*, and if the first or the second CPUs 10*a* or 10*b* does not sent the watchdog signal WDS back to itself (the third CPU 10*c*), the third CPU 10*c* causes the relay R4*a* or R4*b* to be non-excited so as to open the normally-open contacts r4*a* or r4*b* to thereby perform an emergency stop.

The third CPU 10*c* performs processing similar to that of Steps b2 to b6 in FIG. 4 every prescribed cycles. The third CPU 10*b* sends watchdog signals WDS to the first CPU 10*a* and to the second CPU 10*b*, and if the watchdog signals WDS are sent back to the third CPU 10*c* from the first CPU 10*a* and from the second CPU 10*b*, respectively, before the timer T completes timing, the third CPU 10*b* ends the processing of the present cycle. On the other hand, if the watchdog signals WDS are not sent back to the third CPU 10*c* before the timer T completes timing, the third CPU 10*c* outputs an emergency stop command to the digital output elements DO2*a* and DO2*b* so as to cause the relays R4*a* and R4*b* to be non-excited to thereby open the normally-open contacts r4*a* and r4*b* and to perform an emergency stop.

On the sides of the first CPU 10*a* and the second CPU 10*b*, they perform processing similar to the processing shown in FIG. 5 except Steps c2 and c3. If the first CPU 10*a* and the second CPU 10*b* operate normally and they receive watchdog signals from the third CPU 10*c* within the prescribed time period, they send the watchdog signals WDS back to the third CPU 10*c*. On the other hand, if the first CPU 10*a* and the second CPU 10*b* do not operate normally, so that they do not send the watchdog signals WDS back to the third CPU 10*c* within the prescribed time period, the third CPU 10*c* outputs an emergency stop command to the relays R4*a* and R4*b* to thereby perform an emergency stop.

Although, in the second embodiment, the digital output elements DO2*a* and DO2*b* and the relays R4*a* and R4*b* are provided, it may be acceptable that these digital output elements and the relays are not to be provided, and the third CPU 10*c* transmits an emergency stop command to the first CPU 10*a* and to the second CPU 10*b* as shown by the dashed lines in FIG. 6, and the first and second CPUs 10*a* and 10*b*, when received the emergency stop command, cause the contacts r3*a* and r3*b* of the relays R3*a* and R3*b* in their systems to be opened. Further, although, in FIG. 6, a watchdog signal WDS is also transmitted and received between the first CPU 10*a* and the second CPU 10*b*, abnormal operations in the first CPU 10*a* and the second CPU 10*b* can be detected due to the transmission and reception of the watchdog signals WDS performed between the first CPU 10*a* and the third CPU 10*c* and between the second CPU 10*b* and the third CPU 10*c*. Therefore, a detection of abnormality through the transmission and reception of the watchdog signal WDS between the first CPU 10*a* and the second CPU 10*b* may not be performed. However, if this detection of abnormality is performed, the emergency stop operation becomes more accurate.

What is claimed is:

1. An emergency stop circuit comprising:

two emergency stop lines, each of which is connected with a contactor; and a power supply circuit for supplying power to a motor for driving a machine from a power source via series circuits composed of contacts of respective contactors, wherein on each of the emergency stop lines, a contact being opened when an emergency stop command signal is inputted from an emergency stop factor, and a contact being opened by a command from a CPU provided to each of the emergency stop lines, are connected in series to thereby connect the contactor with the power source, the emergency stop circuit includes detecting means, with respect to respective contacts, for detecting states of the contacts, and each of the CPUs outputs a command to open a contact on a self emergency stop line when information about the states of the contacts of the self emergency stop line, detected by the detecting means, and information about the states of the contacts of another emergency stop line, transmitted from another CPU, do not coincide with each other.

2. The emergency stop circuit according to claim 1, wherein the CPUs transmit and receive a watchdog signal between them so as to check, with each other, whether an operation of another CPU is normal, and when either CPU detects an abnormal operation of the other CPU through the check, the CPU outputs a command to open a contact on the self emergency stop line to thereby open the self emergency stop line.

3. The emergency stop circuit according to claim 1, wherein each contactor is provided with a detecting contact operable with the contacts of the contactor so as to detect contact states thereof, and contact state detecting means for detecting a contact state of the detecting contact, and detected information from the contact state detecting means is included in the states of the contacts of the emergency stop line.

4. The emergency stop circuit according to claim 1, further comprising:

an additional CPU provided besides the respective CPUs corresponding to the respective emergency stop lines; and contacts which are provided on respective emergency stop lines and are opened by a command from the additional CPU, wherein the respective CPUs corresponding to the respective emergency stop lines and the additional CPU transmit and receive watchdog signals between them so as to check whether operations of the CPUs are normal, and when the additional CPU detects an abnormal operation in either of the CPUs corresponding to the respective emergency stop lines, the additional CPU outputs at least a command to open a contact provided on the emergency stop line of the CPU in which the abnormal operation is detected.

5. The emergency stop circuit according to claim 1, further comprising:

an additional CPU provided besides the respective CPUs corresponding to the respective emergency stop lines; wherein the respective CPUs corresponding to the respective emergency stop lines and the additional CPU transmit and receive watchdog signals between them so as to check whether operations of the CPUs are normal, and when the additional CPU detects an abnormal operation in either of the CPUs corresponding to the respective emergency stop lines, the additional CPU outputs at least an emergency stop command to a CPU in which the abnormal operation is not detected, and the CPU receiving the emergency stop command outputs a command to open a contact provided on the emergency stop line.

6. An emergency stop circuit comprising:

two emergency stop lines, each of which is connected with a contactor; and a power supply circuit for supplying power to a motor for driving a machine from a power source via series circuits composed of contacts of respective contactors, wherein on each of the emergency stop lines, a contact being opened when an emergency stop command signal is inputted from an emergency stop factor, and a contact being opened by a command from a CPU provided to each of the emergency stop lines, are connected in series to thereby connect the contactor with the power source, the emergency stop circuit includes detecting means, with respect to respective contacts, for detecting states of the contacts, and each of the CPUs determines whether the states of the contacts on a self emergency stop line, detected by the detecting means, are normal to conduct the contactor, and if they are not normal, transmits an abnormality signal to another CPU, and the other CPU receiving the abnormality signal outputs a command to open a contact on a self emergency stop line.

7. The emergency stop circuit according to claim 6, wherein a CPU, determining that the states of the contacts of the self emergency stop line are not normal to conduct the contactor, also outputs a command to a contact on the self emergency stop line to open the contact.

8. The emergency stop circuit according to claim 6, wherein the CPUs transmit and receive a watchdog signal between them so as to check, with each other, whether an operation of another CPU is normal, and when either CPU detects an abnormal operation of the other CPU through the check, the CPU outputs a command to open a contact on the self emergency stop line to thereby open the self emergency stop line.

9. The emergency stop circuit according to claim 6, wherein each contactor is provided with a detecting contact operable with the contacts of the contactor so as to detect contact states thereof, and contact state detecting means for detecting a contact state of the detecting contact, and detected information from the contact state detecting means is included in the states of the contacts of the emergency stop line.

10. The emergency stop circuit according to claim 6, further comprising:

an additional CPU provided besides the respective CPUs corresponding to the respective emergency stop lines; and contacts which are provided on respective emergency stop lines and are opened by a command from the additional CPU, wherein the respective CPUs corresponding to the respective emergency stop lines and the additional CPU transmit and receive watchdog signals between them so as to check whether operations of the CPUs are normal, and when the additional CPU detects an abnormal operation in either of the CPUs corresponding to the respective emergency stop lines, the additional CPU outputs at least a command to open a contact provided on the emergency stop line of the CPU in which the abnormal operation is detected.

11. The emergency stop circuit according to claim 6, further comprising:

an additional CPU provided besides the respective CPUs corresponding to the respective emergency stop lines; wherein the respective CPUs corresponding to the respective emergency stop lines and the additional CPU transmit and receive watchdog signals between them so as to check whether operations of the CPUs are normal, and when the additional CPU detects an abnormal operation in either of the CPUs corresponding to the respective emergency stop lines, the additional CPU outputs at least an emergency stop command to a CPU in which the abnormal operation is not detected, and the CPU receiving the emergency stop command outputs a command to open a contact provided on the emergency stop line.

* * * * *

UNITED STATES PATENT AND TRADEMARK OFFICE
CERTIFICATE OF CORRECTION

PATENT NO. : 6,992,458 B2      
APPLICATION NO. : 10/999948
DATED : January 31, 2006
INVENTOR(S) : Yoshiki Hashimoto et al.

It is certified that error appears in the above-identified patent and that said Letters Patent is hereby corrected as shown below:

column 2, line 57 delete “rb3” and insert --r3b-- column 4, line 60 delete “Omitted” and insert --omitted-- column 5, line 43 delete “Doa” and insert --DOa-- column 5, line 44 delete “Dob,” and insert --DOb,-- column 6, line 56 delete “CPU-10*b*” and insert --CPU 10*b*--.

column 6, line 62 delete “first-CPU” and insert --first CPU-- column 10, line 24 delete “10*b*;” and insert --10*b*,--

Signed and Sealed this

Fifteenth Day of August, 2006

JON W. DUDAS
*Director of the United States Patent and Trademark Office*